(12) United States Patent
Wilson et al.

(10) Patent No.: US 10,040,541 B2
(45) Date of Patent: Aug. 7, 2018

(54) DYNAMIC ACTIVATION OF PUMPS OF A FLUID POWER SYSTEM

(71) Applicant: The Boeing Company, Chicago, IL (US)

(72) Inventors: Thomas M. Wilson, Seattle, WA (US); Edmond C. Chin, Seattle, WA (US); Mark W. Lesyna, Everett, WA (US); Thomas R. Hasenoehrl, Stanwood, WA (US)

(73) Assignee: THE BOEING COMPANY, Chicago, IL (US)

( * ) Notice: Subject to any disclaimer, the term of this patent is extended or adjusted under 35 U.S.C. 154(b) by 585 days.

(21) Appl. No.: 14/626,676

(22) Filed: Feb. 19, 2015

(65) Prior Publication Data

US 2017/0057619 A1    Mar. 2, 2017

(51) Int. Cl.
| | |
|---|---|
| *B64C 13/42* | (2006.01) |
| *B64C 13/40* | (2006.01) |
| *B64C 13/48* | (2006.01) |
| *B64C 25/22* | (2006.01) |
| *B64C 25/26* | (2006.01) |
| *B64C 25/28* | (2006.01) |
| *F04B 23/04* | (2006.01) |
| *F04B 49/06* | (2006.01) |

(Continued)

(52) U.S. Cl.
CPC .............. *B64C 13/42* (2013.01); *B64C 13/40* (2013.01); *B64C 13/48* (2013.01); *B64C 25/22* (2013.01); *B64C 25/26* (2013.01); *B64C 25/28* (2013.01); *F04B 23/04* (2013.01); *F04B 49/065* (2013.01); *F04B 49/20* (2013.01); *F15B 18/00* (2013.01); *F15B 2211/20576* (2013.01); *F15B 2211/665* (2013.01); *F15B 2211/875* (2013.01)

(58) Field of Classification Search
None
See application file for complete search history.

(56) References Cited

U.S. PATENT DOCUMENTS

| | | | | |
|---|---|---|---|---|
| 5,100,082 A | * | 3/1992 | Archung | B64D 41/00 244/76 R |
| 2004/0129835 A1 | * | 7/2004 | Atkey | B64D 13/06 244/118.5 |
| 2004/0195909 A1 | * | 10/2004 | Hamzeh | B60T 8/00 303/10 |

FOREIGN PATENT DOCUMENTS

| | | | | |
|---|---|---|---|---|
| CA | 2831759 A1 | * | 1/2014 | F04B 23/04 |
| EP | 0168843 A1 | | 1/1986 | |

(Continued)

OTHER PUBLICATIONS

Extended European Search Report for EP Application No. 16156512.2, dated Jun. 17, 2016, 7 pages.

(Continued)

*Primary Examiner* — Kenneth J Hansen
(74) *Attorney, Agent, or Firm* — Toler Law Group, PC

(57) ABSTRACT

A method includes receiving pump cycle location data associated with a fluid power system. The fluid power system includes a plurality of pumps (including at least a first pump, a second pump, and a third pump). Based on the pump cycle location data having a first value, the method includes activating the first pump as a primary pump. Based on the pump cycle having a second value, the method includes activating the second pump as the primary pump. The method also includes activating the third pump as a secondary pump when the fluid power system is in a multiple-pump operating mode.

21 Claims, 7 Drawing Sheets

(51) Int. Cl.
   *F15B 18/00*    (2006.01)
   *F04B 49/20*    (2006.01)

(56) References Cited

FOREIGN PATENT DOCUMENTS

EP       1897804 A2       3/2008
   EP       2402247 A2 *     1/2012   ............. B64C 13/42

OTHER PUBLICATIONS

Boeing B777—Systems Summary [Hydraulics]; www.smartcockpit.com/download.php; Feb. 25, 2008, 13 pages.

* cited by examiner

DYNAMIC ACTIVATION OF PUMPS OF A FLUID POWER SYSTEM

FIELD

The present disclosure generally relates to dynamic activation of pumps of a fluid power system.

BACKGROUND

Hydraulic systems and pneumatic systems distribute pressurized fluid to provide power to enable movement of some systems. For example, an aircraft may use pneumatically-driven hydraulic pumps to move control surfaces, landing gear, etc. Multiple pumps may pressurize the hydraulic system if pressure demands vary widely or if a backup pump is needed in case of failure of a primary pump. When pumps run at different times, controlling usage cycles of the pumps can improve reliability of the system. It may be difficult to manage usage levels of different pumps in multiple-pump systems in order to avoid increased usage (and associated life cycle decrease) of some pump(s) with respect to other pump(s).

SUMMARY

In an embodiment, a method includes receiving pump cycle location data associated with a fluid power system. The fluid power system includes a plurality of pumps (including at least a first pump, a second pump, and a third pump). Based on the pump cycle location data having a first value, the method includes activating the first pump as a primary pump. Based on the pump cycle having a second value, the method includes activating the second pump as the primary pump. The method also includes activating the third pump as a secondary pump when the fluid power system is in a multiple-pump operating mode.

In another embodiment, a vehicle is disclosed. The vehicle includes a fluid power system and a control system. The fluid power system includes a plurality of pumps (including at least a first pump, a second pump, and a third pump). The control system is communicatively coupled to the fluid power system. The control system includes logic to receive pump cycle location data associated with the fluid power system. The control system further includes logic to activate the first pump as a primary pump (based on the pump cycle location data having a first value) and logic to activate the second pump as the primary pump (based on the pump cycle location data having a second value). The control system also includes logic to activate the third pump as a secondary pump when the fluid power system is in a multiple-pump operating mode.

In another embodiment, a method includes receiving information associated with an aircraft at a control system. The control system is communicatively coupled to a fluid power system of the aircraft, and the fluid power system includes at least three pumps. The method includes determining, based on information associated with the aircraft, pump cycle location data associated with the fluid power system. The method further includes designating a primary pump, a secondary pump, and a tertiary pump (based on the pump cycle location data). The method also includes activating at least the primary pump during operation of the aircraft.

In yet another embodiment, a control system for a fluid power system is disclosed. The control system includes a first pump controller, a second pump controller, and a third pump controller. The pump controllers are associated with at least a first pump, a second pump, and a third pump. Each pump controller includes logic to receive pump cycle location data associated with the fluid power system. Based on the pump cycle location data having a first value, the logic causes the first pump controller to activate the first pump as a primary pump. Based on the pump cycle location data having a second value, the logic causes the second pump controller to activate the second pump as the primary pump. The logic causes the third pump controller to activate the third pump as a secondary pump when the fluid power system is in a multiple-pump operating mode.

The described features, functions, and advantages may be achieved independently in various embodiments or may be combined in yet other embodiments further details of which can be seen with reference to the following description and drawings.

DETAILED DESCRIPTION

The present disclosure describes systems and methods of dynamically activating pumps of a fluid power system (that includes at least three pumps). For example, a vehicle (e.g., an aircraft) may include multiple pumps, such as pneumatically-driven (e.g., air-driven) hydraulic pumps. In some cases, the pumps may represent "demand" pumps that provide additional hydraulic fluid to one or more aircraft hydraulic systems during particular time period(s) and/or operating condition(s) that represent periods of "high demand" for hydraulic fluid. To illustrate, in the context of an aircraft hydraulic system, operations associated with relatively high demand for hydraulic fluid may include flap extension/retraction, landing gear retraction/extension, wing tip folding, among other alternatives.

While some aircraft may include two "demand" pumps for use in either a single-pump operating mode or a dual-pump operating mode, it may be difficult to control more than two "demand" pumps in order to avoid excessive wear on particular pump(s). Further, in the event of a pump failure, an aircraft that includes only two "demand" pumps may be unable to provide adequate pressure or volume of hydraulic fluid during operations that would normally be associated with the dual-pump operating mode.

In the present disclosure, a fluid power system includes at least three pumps (e.g., hydraulic pumps). Control systems (e.g., hydraulic interface modules) associated with the individual pumps may share pump status information. The control system of each of the pumps may independently determine whether a particular pump is designated as a "primary" demand pump, a "secondary" demand pump, a "tertiary" demand pump, etc. Communication between the control systems of the different pumps may allow the control systems to dynamically adapt to changing parameters or conditions. To illustrate, different pumps may be designated as primary/secondary/tertiary depending on a particular day or a takeoff/landing cycle, among other alternatives. Further, in the event of a pump failure, the control systems may independently designate alternate primary and/or secondary pump(s) such that a sufficient number of pumps (e.g., at least two) are available during a multiple-pump operating mode (e.g., a dual-pump operating mode).

Figure 1:
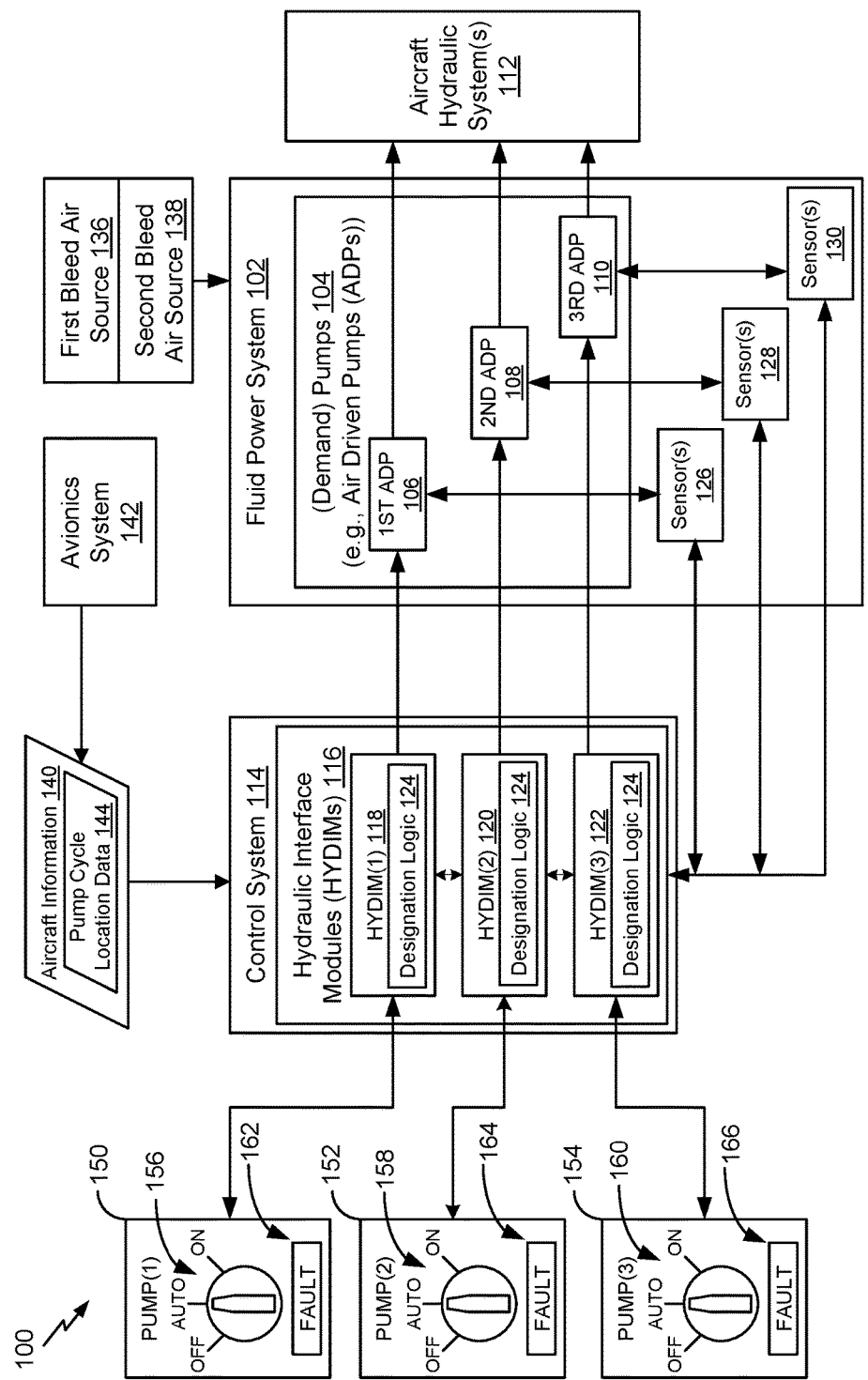
FIG. 1 is a block diagram of a particular embodiment of a system to dynamically control activation of pumps of a fluid power system.

FIG. 1 is a diagram 100 depicting a particular example of a system to dynamically control activation of pumps 104 of a fluid power system 102 that includes at least three pumps. For example, the fluid power system 102 may include or correspond to a fluid power system associated with a vehicle, such as an aircraft. One or more of the pumps of the fluid power system 102 may be dynamically activated based on various parameters (e.g., a time period, a relative demand for hydraulic fluid, etc.). In FIG. 1, one pump may be dynamically selected for activation during period(s) of relatively low demand for hydraulic fluid (e.g., a single-pump operating mode), and additional pump(s) may be selected for activation during period(s) of relatively high demand for hydraulic fluid (e.g., a multiple-pump operating mode).

In FIG. 1, the pumps 104 are pneumatically-driven hydraulic pumps (e.g., air driven pumps (ADPs)). In other embodiments, the pumps 104 may be alternative type(s) of hydraulic pumps. The pneumatically-driven hydraulic pumps may be driven, for example, using bleed air from engine(s) of the aircraft. In a particular embodiment, one bleed air source of the aircraft may provide air to a single pump when the fluid power system 102 is in a single-pump operating mode, and another air source may provide air to multiple pumps when the fluid power system 102 is in a multiple-pump operating mode. In some cases, different bleed air sources (e.g., two bleed air sources) may selectively provide power to different numbers of pumps. To illustrate, a first bleed air source 136 may provide power to a single pump during a first time period (e.g., a first day), and a second bleed air source 138 may provide power to multiple pumps during the first time period. The first bleed air source 136 may provide power to multiple pumps during a second time period (e.g., a second day), and the second bleed air source 138 may provide power to a single pump during the second time period. An overall in-service availability over a life of the aircraft may be improved by varying a number of pumps that are powered by a particular bleed air source. In the particular embodiment illustrated in FIG. 1, the pumps 104 include a first pump 106 (identified as "1ST ADP" in FIG. 1), a second pump 108 (identified as "2ND ADP" in FIG. 1), and a third pump 110 (identified as "3RD ADP" in FIG. 1). In alternative cases, the pumps 104 may include more than three pumps. One or more of the pumps 104 may provide hydraulic fluid to one or more aircraft hydraulic systems 112. In some cases, each of the pumps 104 may be configured to operate at different speeds (e.g., a "normal" speed and a "reserve" speed). To illustrate, each of the pumps 104 may operate at a first speed (e.g., the "normal" speed) in some cases (e.g., responsive to a first control input associated with the first speed), and each of the pumps 104 may operate at a second speed (e.g., the "reserve" speed) in other cases (e.g., responsive to a second control input associated with the second speed). As an illustrative, non-limiting example, the "reserve" speed may represent about 20 percent more capability than the "normal" speed.

While not shown in FIG. 1, one or more other pumps may provide hydraulic fluid to the aircraft hydraulic system(s) 112 during "typical" aircraft operating conditions. The plurality of pumps 104 illustrated in FIG. 1 may represent "supplementary" pumps (also referred to herein as "demand" pumps) that provide additional hydraulic fluid to the aircraft hydraulic system(s) 112 during particular time period(s) and/or operating condition(s) that represent periods of "high demand" for hydraulic fluid. For example, as described further herein with respect to FIG. 2, a single pump of the plurality of (demand) pumps 104 of FIG. 1 may provide hydraulic fluid to the aircraft hydraulic system(s) 112 in a single-pump operating mode during period(s) of relatively low demand for (additional) hydraulic fluid. As another example, more than one pump (e.g., two pumps) of the plurality of (demand) pumps 104 of FIG. 1 may provide hydraulic fluid in a multiple-pump operating mode during period(s) of relatively high demand for hydraulic fluid. As illustrative non-limiting examples, the pumps 104 of FIG. 1 may provide hydraulic fluid to the aircraft hydraulic system(s) 112 during flap extension/retraction, landing gear retraction/extension, wing tip folding, among other alternatives.

FIG. 1 further illustrates that a control system 114 is communicatively coupled to the fluid power system 102. In the particular embodiment illustrated in FIG. 1, the control system 114 includes a plurality of hydraulic interface modules (HYDIMs) 116. The plurality of HYDIMs 116 includes a first HYDIM 118 (identified as "HYDIM(1)" in FIG. 1) associated with the first pump 106, a second HYDIM 120 (identified as "HYDIM(2)" in FIG. 1) associated with the second pump 108, and a third HYDIM 122 (identified as "HYDIM(3)" in FIG. 1) associated with the third pump 110. The first HYDIM 118 is configured to control the first pump 106 (e.g., to activate/deactivate the first pump 106). The second HYDIM 120 is configured to control the second pump 108 (e.g., to activate/deactivate the second pump 108). The third HYDIM 122 is configured to control the third pump 110 (e.g., to activate/deactivate the third pump 110). In alternative cases (e.g., when the fluid power system 102 includes more than three pumps), the control system 114 may include more than three HYDIMs.

In the embodiment illustrated in FIG. 1, each individual HYDIM of the plurality of HYDIMs 116 of the control system 114 includes designation logic 124. The designation logic 124 is configured to designate a particular pump of the fluid power system 102 as a primary pump, a secondary pump, or a tertiary pump, among other alternatives (e.g., in cases where the fluid power system 102 includes more than three pumps). For example, the designation logic 124 may designate one of the pumps 104 as a primary pump (e.g., for use during a single-pump operating mode and during a multiple-pump operating mode). As another example, the designation logic 124 may designate one of the pumps 104 as a secondary pump (e.g., for use as an additional pump during the multiple-pump operating mode). In some cases, the designation logic 124 may designate one of the pumps 104 as a tertiary pump. The tertiary pump may remain inactive when the fluid power system 102 is in the multiple-pump operating mode. Alternatively, the tertiary pump may be activated (e.g., as an alternate primary pump or as an alternate secondary pump) in the event of a failure indication from a pump that is (currently) designated as the primary pump or in the event of a failure indication from a pump that is (currently) designated as the secondary pump.

FIG. 1 further illustrates that one or more sensors 126 may be associated with the first pump 106, one or more sensors 128 may be associated with the second pump 108, and one or more sensors 130 may be associated with the third pump 110. For example, the sensor(s) 126 associated with the first pump 106 may provide first sensor data to the control system 114, the sensor(s) 128 associated with the second pump 108 may provide second sensor data to the control system 114, and the sensor(s) 130 associated with the third pump 110 may provide third sensor data to the control system 114. The first sensor data, the second sensor data, and the third sensor data may be accessible to the first HYDIM 118, to the second HYDIM 120, and to the third HYDIM 122. Illustrative, non-limiting example of sensor data may include temperature data and/or pressure data. In this example, one or more of the HYDIMs 116 may compare the temperature/pressure data received from a particular pump to one or more temperature/pressure thresholds (not shown in FIG. 1). As explained further below, the threshold(s) may be associated with overheating, over-pressure, under-pressure, or other conditions that may be indicative of a pump failure.

In some cases, the individual HYDIMs 116 of the control system 114 may use additional operating parameters (e.g., electrical bus, bleed air capability, a logic and speed control unit (LSCU) state, etc.) that may preclude a particular pump from operating when commanded. Pumps that may be unable to operate when commanded may be identified as inoperative and removed from a priority list. Further, pumps that fail to operate when commanded may also be declared inoperative and removed from the priority list. A particular HYDIM associated with an inoperative pump shares pump inoperability information and priority list update information, and other HYDIMs (associated with operative pumps) may update the priority list. Further, each of the HYDIMs may monitor communication from other HYDIMs and may adjust a pump priority if another HYDIM fails to communicate.

The control system 114 is configured to receive aircraft information 140 from an avionics system 142 (e.g., while the aircraft is on the ground or while the aircraft is in-flight). The aircraft information 140 may include pump cycle location data 144 and (optionally) other information (e.g., information from other aircraft systems). The aircraft information 140 may be received from ground crew or air crew. Alternatively, the aircraft information 140 may be determined automatically by the avionics system 142 (e.g., using a clock or a counter). To illustrate, the pump cycle location data 144 may include a first value or a second value. As an illustrative, non-limiting example, the first value may correspond to a first day, and the second value may correspond to a second day that immediately follows the first day. In alternative cases, the first value may correspond to an odd-numbered day, and the second value may correspond to an even-numbered day, among other alternatives (e.g., takeoff/landing values, pump run-time histories, etc.).

The designation logic 124 may be configured to designate one pump of the plurality of pumps 104 (e.g., the first pump 106) as a primary pump when the pump cycle location data 144 has the first value. The designation logic 124 may be configured to designate a different pump of the plurality of pumps 104 (e.g., the second pump 108) as the primary pump when the pump cycle location data 144 has the second value. In a particular embodiment, the designation logic 124 may designate the third pump 110 as a secondary pump (e.g., for use during a multiple-pump operating mode) when the pump cycle location data 144 has either the first value or the second value. In this example, an overall pump run-time of the third pump 110 over a life of the aircraft may be lower than an overall pump run-time of the first pump 106, may be lower than an overall pump run-time of the second pump 108, or both. However, activation of the third pump 110 during each multiple-pump operating mode may provide a recent indication (e.g., a daily indication) that the third pump 110 is functioning properly. Rather than allowing the third pump 110 to remain idle as a backup pump, the recent indication of proper function may reduce a likelihood of unavailability of more than two of the pumps 104 in the event of a pump failure. In other examples, the pump cycle location data 144 may have a first value, a second value, or a third value, and the third pump 110 may be designated as the primary pump when the pump cycle location data 144 has the third value.

The control system 114 is configured to activate one pump of the plurality of pumps 104 when the fluid power system 102 is in a single-pump operating mode. The control system 114 is configured to activate more than one pump of the plurality of pumps 104 when the fluid power system 102 is in a multiple-pump operating mode. As described further herein with respect to FIG. 2, the multiple-pump operating mode may be a dual-pump operating mode. A dual-pump operating mode is described herein as an illustrative, non-limiting example of a multiple-pump operating mode. In alternative cases, more than two pumps may be activated during a multiple-pump operating mode. The control system 114 is configured to activate a single pump (e.g., the pump that is currently designated as the primary pump) when the fluid power system 102 is in the single-pump operating mode. The control system 114 is configured to activate two pumps (e.g., the pump that is currently designated as the primary pump and the pump that is currently designated as the secondary pump) when the fluid power system 102 is in the dual-pump operating mode.

To illustrate, when the pump cycle location data 144 has the first value, the first HYDIM 118 of the control system 114 may be configured to activate the first pump 106 when the fluid power system 102 is in a single-pump operating mode. When the pump cycle location data 144 has the second value, the second HYDIM 120 of the control system 114 may be configured to activate the second pump 108 when the fluid power system 102 is in a single-pump operating mode. In a particular embodiment, the third HYDIM 122 of the control system 114 may be configured to activate the third pump 110 as a secondary pump when the fluid power system 102 is in a multiple-pump operating mode. As an example, when the first pump 106 is designated as a primary (demand) pump (e.g., based on the pump cycle location data 144 having the first value), the third pump 110 may be activated as a secondary (demand) pump during period(s) associated with relatively high demand for (additional) hydraulic fluid at the aircraft hydraulic system(s) 112. As another example, when the second pump 108 is designated as the primary (demand) pump (e.g., based on the pump cycle location data 144 having the second value), the third pump 110 may be activated as the secondary (demand) pump during period(s) associated with relatively high demand for hydraulic fluid at the aircraft hydraulic system(s) 112.

The control system 114 may be further configured to receive a failure indication from one or more of the pumps 104 (or to determine that a particular pump has failed based on sensor data received from the sensors 126, 128, 130).

When the failure indication is received from a pump that is (currently) designated as a primary pump, a different pump (e.g., a tertiary pump) may be designated as an alternate primary pump. As an example, when the pump cycle location data 144 has the first value and the first pump 106 is designated as the primary pump, the second HYDIM 120 may be configured to activate (or designate) the second pump 108 as the alternate primary pump in response to an indication of failure of the first pump 106. As another example, when the pump cycle location data 144 has the second value and the second pump 108 is designated as the primary pump, the first HYDIM 118 may be configured to activate (or designate) the first pump 106 as the alternate primary pump in response to an indication of failure of the second pump 108. When the failure indication is received from a pump that is (currently) designated as a secondary pump, a different pump (e.g., the tertiary pump) may be designated as an alternate secondary pump. As an example, when the first pump 106 is designated as the primary pump and the third pump 110 is designated as the secondary pump (e.g., when the pump cycle location data 144 has the first value), the second HYDIM 120 may be configured to activate (or designate) the second pump 108 as an alternate secondary pump in response to an indication of failure of the third pump 110. As another example, when the second pump 108 is designated as the primary pump and the third pump 110 is designated as the secondary pump (e.g., when the pump cycle location data 144 has the second value), the first HYDIM 118 may be configured to activate (or designate) the first pump 106 as an alternate secondary pump in response to an indication of failure of the third pump 110. In a particular embodiment, when a failure indication is received from more than one pump, a fault message may be communicated in order to indicate that an amount of fluid power that is available may be inadequate (e.g., in a designated multiple-pump operating mode).

In the particular embodiment illustrated in FIG. 1, the control system 114 is communicatively coupled to one or more interfaces (e.g., located in a flight-deck of the aircraft). For example, a first pump interface 150 may be associated with the first pump 106, a second pump interface 152 may be associated with the second pump 108, and a third pump interface 154 may be associated with the third pump 110. In alternative embodiments, a single pump interface (e.g., a touchscreen display or other interface) may be associated with each pump of the plurality of pumps 104. In the example of FIG. 1, the first pump interface 150 includes a first pump switch 156, the second pump interface 152 includes a second pump switch 158, and the third pump interface 154 includes a third pump switch 160. The first pump interface 150 is configured to provide a signal to the control system 114 regarding a position of the first pump switch 156. The second pump interface 152 is configured to provide a signal to the control system 114 regarding a position of the second pump switch 158. The third pump interface 154 is configured to provide a signal to the control system 112 regarding a position of the third pump switch 160.

FIG. 1 further illustrates that the first pump interface 150 may include a first fault indicator 162 to provide an indication of pump failure of the first pump 106. The second pump interface 152 may include a second fault indicator 164 to provide an indication of pump failure of the second pump 108. The third pump interface 154 may include a third fault indicator 166 to provide an indication of pump failure of the third pump 110. In some cases, a crew member may manually deactivate a particular pump in response to a failure indication (e.g., by toggling to the off mode). In other cases, the individual HYDIMs 116 of the control system 114 may be configured to automatically re-designate one of the pumps 104 (e.g., a currently designated tertiary pump) as an alternate primary/secondary pump. The individual HYDIMs 116 of the control system 114 may be further configured to automatically activate the alternate primary/secondary pumps during single/multiple pump operating modes.

In operation, the control system 114 may receive the pump cycle location data 144 associated with the fluid power system 102. As an example, the control system 114 may receive the pump cycle location data 144 before takeoff (e.g., while the aircraft is on the ground). In a particular embodiment, the designation logic 124 may determine whether the pump cycle location data 144 has a first value (e.g., a value corresponding to an odd-numbered day) or a second value (e.g., a value corresponding to an even-numbered day). In the event that the pump cycle location data 144 has the first value, the first pump 106 may be designated as the primary pump, the third pump 110 may be designated as the secondary pump, and the second pump 108 may be designated as the tertiary pump. In the event that the pump cycle location data 144 has the second value, the second pump 108 may be designated as the primary pump, the third pump 110 may be designated as the secondary pump, and the first pump 106 may be designated as the tertiary pump. It will be appreciated that designation of pump status (e.g., as primary/secondary/tertiary) based on a first value or a second value is an illustrative, non-limiting example. As an example of an alternative embodiment, the designation logic 124 may determine whether the pump cycle location data 144 has a first value (e.g., associated with the first pump 106), a second value (e.g., associated with the second pump 108), or a third value (e.g., associated with the third pump 110). Additionally, as explained further below, a position of the pump switches 156-160 may override the designation based on the pump cycle location data 144.

The pump designation information (e.g., primary/secondary/tertiary) may be available to each of the HYDIMs 116. For example, in the embodiment illustrated in FIG. 1, each of the HYDIMs 116 includes the (same) designation logic 124 and may independently determine a designation of a particular pump based on whether the pump cycle location data 144 has the first value or the second value. To illustrate, the designation logic 124 of first HYDIM 118, the designation logic 124 of the second HYDIM 120, and the designation logic 124 of the third HYDIM 122 may each independently determine pump designations for each pump of the plurality of pumps 104 of the fluid power system 102. For example, the designation logic 124 of each of the HYDIMs 118-122 may determine that the first pump 106 is to be used as the primary pump when the pump cycle location data 144 has the first value and that the second pump 108 is to be used as the secondary pump when the pump cycle location data 144 has the second value. As described further herein, independent designation by the designation logic 124 of each of the HYDIMs 118-122 may allow the HYDIMs to independently re-designate/activate alternate primary/secondary pump(s) in response to a pump failure indication.

Figure 2:
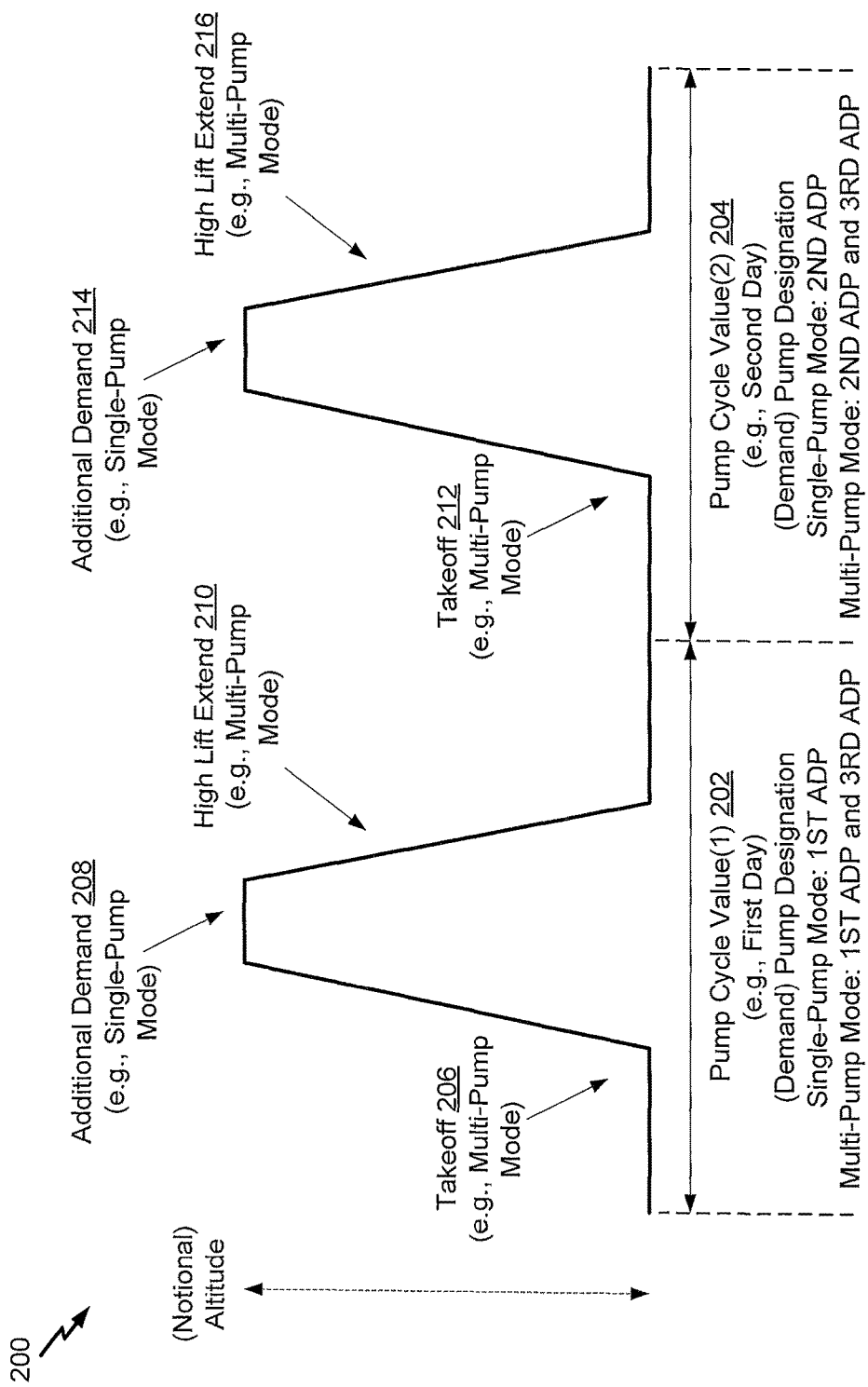
FIG. 2 is a notional altitude diagram illustrating an example of dynamic control of activation of pumps of a fluid power system of an aircraft.

As described further herein with respect to FIG. 2, after (initial) designation of the primary/secondary/tertiary pumps, one or more of the pumps may be activated during single/multiple pump operating modes. For example, when the first pump 106 is designated as the primary pump, each of the HYDIMs 116 of the control system 114 may receive a control input (e.g., from the avionics system 142) that corresponds to a single-pump operating mode control input.

The first HYDIM 118 may determine that the first pump 106 is currently designated as the primary pump and is to be activated responsive to the single-pump operating mode control input. In response, the first HYDIM 118 may activate the first (demand) pump 106 to provide (additional) hydraulic fluid to the aircraft hydraulic system(s) 112. The second HYDIM 120 may determine that the second pump 108 is currently designated as the tertiary pump and is to remain inactive. Further, the third HYDIM 122 may determine that the third pump 110 is currently designated as the secondary pump and is to remain inactive responsive to a single-pump operating mode control input.

As another example, when the first pump 106 is (currently) designated as the primary pump, each of the HYDIMs 116 of the control system 114 may receive a control input (e.g., from the avionics system 142) that corresponds to a multiple-pump operating mode control input. The first HYDIM 118 may determine that the first pump 106 is currently designated as the primary pump and is to be activated responsive to the multiple-pump operating mode control input. In response, the first HYDIM 118 may activate the first (demand) pump 106 to provide (additional) hydraulic fluid to the aircraft hydraulic system(s) 112. The second HYDIM 120 may determine that the second pump 108 is currently designated as the tertiary pump and is to remain inactive. The third HYDIM 122 may determine that the third pump 110 is currently designated as the secondary pump and is to be activated responsive to the multiple-pump operating mode control input. The third HYDIM 122 may activate the third (demand) pump 110 to provide (additional) hydraulic fluid to the aircraft hydraulic system(s) 112.

As a further example, when the second pump 108 is (currently) designated as the primary pump, each of the HYDIMs 116 of the control system 114 may receive a control input (e.g., from the avionics system 142) that corresponds to a single-pump operating mode control input. The first HYDIM 118 may determine that the first pump 106 is currently designated as the tertiary pump and is to remain inactive. The second HYDIM 120 may determine that the second pump 108 is currently designated as the primary pump and is to be activated responsive to the single-pump operating mode control input. In response, the second HYDIM 120 may activate the second (demand) pump 108 to provide (additional) hydraulic fluid to the aircraft hydraulic system(s) 112. The third HYDIM 122 may determine that the third pump 110 is currently designated as the secondary pump and is to remain inactive responsive to a single-pump operating mode control input.

As another example, when the second pump 108 is (currently) designated as the primary pump, each of the HYDIMs 116 of the control system 114 may receive a control input (e.g., from the avionics system 142) that corresponds to a multiple-pump operating mode control input. The first HYDIM 118 may determine that the first pump 106 is currently designated as the tertiary pump and is to remain inactive. The second HYDIM 120 may determine that the second pump 106 is currently designated as the primary pump and is to be activated responsive to the multiple-pump operating mode control input. In response, the second HYDIM 120 may activate the second (demand) pump 108 to provide (additional) hydraulic fluid to the aircraft hydraulic system(s) 112. The third HYDIM 122 may determine that the third pump 110 is currently designated as the secondary pump and is to be activated responsive to the multiple-pump operating mode control input. The third HYDIM 122 may activate the third (demand) pump 110 to provide (additional) hydraulic fluid to the aircraft hydraulic system(s) 112.

FIG. 1 further illustrates that sensor data from each of the sensors 126-130 is available to each of the HYDIMs 118-122. While FIG. 1 illustrates an example in which the sensor data is provided to each of the HYDIMs 118-122, it will be appreciated that the individual HYDIMs may receive sensor data from sensors associated with individual pumps and communicate the sensor data to the other HYDIMs. In some cases, the sensor data may be indicative of a pump failure. As an example, the sensors 126-130 may include temperature sensors or pressure sensors. While not shown in FIG. 1, particular temperature threshold(s) may be associated with overheating of a particular pump, first pressure threshold(s) may be associated with overpressure of a particular pump, second pressure threshold(s) may be associated with underpressure of a particular pump, or a combination thereof. In a particular embodiment, a particular HYDIM that is configured to activate a particular pump may determine that sensor data from the particular pump is indicative of pump failure. The particular HYDIM may provide a corresponding signal (e.g., a pump failure indication) to the other HYDIMs. In response, the designation logic 124 of each of the HYDIMs may independently re-designate the pumps 104 based on the pump failure indication.

As an illustrative, non-limiting example, the first HYDIM 118 may receive sensor data from the sensor(s) 126 associated with the first pump 106 when the first pump 106 is (currently) designated as the primary pump (e.g., based on the pump cycle location data 144 having the first value). The first HYDIM 118 may determine, based on the sensor data from the sensor(s) 126, that one or more threshold(s) associated with pump failure are satisfied and may provide a failure indication to the second HYDIM 120 and to the third HYDIM 122. Alternatively, the second HYDIM 120 and the third HYDIM 122 may independently determine that the first pump 106 has failed. Responsive to the failure indication, the designation logic 124 of the HYDIMs may independently determine an alternate primary pump. In a particular embodiment, the designation logic 124 may determine that the second pump 108 (which is currently designated as the tertiary pump) is to be re-designated as the alternate primary pump. In this example, the third pump 110 may remain the currently designated secondary pump. In response to receiving a control input (e.g., from the avionics system 142) that corresponds to a single-pump operating mode control input, the second HYDIM 120 may activate the second pump 108 (while the third pump 110 remains inactive). In response to receiving a second control input that corresponds to a multiple-pump operating mode control, the second HYDIM 120 may activate the second pump 108 and the third HYDIM 122 may activate the third pump 110.

As another illustrative, non-limiting example, the second HYDIM 120 may receive sensor data from the sensor(s) 128 associated with the second pump 108 when the second pump 108 is (currently) designated as the primary pump (e.g., based on the pump cycle location data 144 having the second value). The second HYDIM 120 may determine, based on the sensor data from the sensor(s) 128, that one or more threshold(s) associated with pump failure are satisfied and may provide a failure indication to the first HYDIM 118 and to the third HYDIM 122. Alternatively, the first HYDIM 118 and the third HYDIM 122 may independently determine that the second pump 108 has failed. Responsive to the failure indication, the designation logic 124 of the HYDIMs may independently determine an alternate primary pump. In a particular embodiment, the designation logic 124 may determine that the first pump 106 (which is currently designated as the tertiary pump) is to be re-designated as the alternate primary pump. In this example, the third pump 110 may remain the currently designated secondary pump. In response to receiving a control input (e.g., from the avionics system 142) that corresponds to a single-pump operating mode control input, the first HYDIM 118 may activate the first pump 106 (while the third pump 110 remains inactive). In response to receiving a second control input that corresponds to a multiple-pump operating mode control, the first HYDIM 118 may activate the first pump 106 and the third HYDIM 122 may activate the third pump 110.

As yet another illustrative, non-limiting example, the third HYDIM 122 may receive sensor data from the sensor(s) 130 associated with the third pump 110 when the third pump 110 is (currently) designated as the secondary pump (e.g., based on the pump cycle location data 144 having the first value or the second value). The third HYDIM 122 may determine, based on the sensor data from the sensor(s) 130, that one or more threshold(s) associated with pump failure are satisfied and may provide a failure indication to the first HYDIM 118 and to the second HYDIM 120. Alternatively, the first HYDIM 118 and the second HYDIM 120 may independently determine that the third pump 110 has failed. Responsive to the failure indication, the designation logic 124 of the HYDIMs may independently determine an alternate secondary pump. In a particular embodiment, in the event that the pump cycle location data 144 has the first value, the designation logic 124 may determine that the second pump 108 (which is currently designated as the tertiary pump) is to be re-designated as the alternate secondary pump. In the event that the pump cycle location data 144 has the second value, the designation logic 124 may determine that the first pump 106 (which is currently designated as the tertiary pump) is to be re-designated as the alternate secondary pump.

In response to receiving a control input (e.g., from the avionics system 142) that corresponds to a single-pump operating mode control input when the first pump 106 is designated as the alternate secondary pump, the second HYDIM 120 may activate the second pump 108 (while the first pump 106 remains inactive). In this case, when a second control input is received that corresponds to a multiple-pump operating mode control, the second HYDIM 120 may activate the second pump 108 and the first HYDIM 118 may activate the first pump 106.

In response to receiving a control input (e.g., from the avionics system 142) that corresponds to a single-pump operating mode control input when the second pump 108 is designated as the alternate secondary pump, the first HYDIM 118 may activate the first pump 106 (while the second pump 108 remains inactive). In this case, when a second control input is received that corresponds to a multiple-pump operating mode control, the first HYDIM 118 may activate the first pump 106 and the second HYDIM 120 may activate the second pump 108.

In the example of FIG. 1, the first pump controller 156 associated with the first pump interface 150, the second pump controller 158 associated with the second pump interface 152, and the third pump controller 160 associated with the third pump interface 154 are each illustrated as being in the automatic operating mode. In some cases, a crew member may change an operating mode of one or more of the pumps. In response to a change of operating mode, the designation logic 124 may independently determine whether to adjust (current) primary/secondary/tertiary designations.

As an illustrative example, when the first pump controller 156 is in the on operating mode, the designation logic 124 of each of the HYDIMs 116 may determine that the first pump 106 is the primary pump. In the event that the first pump 106 is currently designated as the primary pump (e.g., when the pump cycle location data 144 has the first value), the third pump 110 may remain designated as the secondary pump. In the event that the first pump 106 is currently designated as the tertiary pump (e.g., when the pump cycle location data 144 has the second value), the second pump 108 may be re-designated as the tertiary pump, and the third pump 110 may remain designated as the secondary pump. Alternatively, the second pump 108 may be re-designated as the secondary pump, and the third pump 110 may be re-designated as the tertiary pump. It will be appreciated that similar determinations may be made in the event that the second pump controller 158 is changed to the on operating mode or in the event that the third pump controller 160 is changed to the on operating mode.

As another illustrative example, when the first pump controller 156 is in the off operating mode, the designation logic 124 of each of the HYDIMs 116 may determine whether the first pump 106 is (currently) designated as the primary pump. In the event that the first pump 106 is currently designated as the primary pump (e.g., when the pump cycle location data 144 has the first value), the second pump 108 may be re-designated as the primary pump, and the third pump 110 may remain designated as the secondary pump. In the event that the first pump 106 is currently designated as the tertiary pump (e.g., when the pump cycle location data 144 has the second value), the second pump 108 may remain designated as the primary pump, and the third pump 110 may remain designated as the secondary pump. It will be appreciated that similar determinations may be made in the event that the second pump controller 158 is changed to the off operating mode or in the event that the third pump controller 160 is changed to the off operating mode.

Thus, FIG. 1 illustrates that one or more pumps of a fluid power system (of vehicle, such as an aircraft) may be dynamically activated based on various parameters (e.g., a time period, a relative demand for hydraulic fluid, etc.). Dynamic activation of particular pump(s) may distribute pump cycle(s) between at least three pumps to at least partially "level-load" usage the pumps in order to reduce wear on particular pump(s). In FIG. 1, one pump may be dynamically selected for activation during period(s) of relatively low demand for hydraulic fluid (e.g., a single-pump operating mode), and additional pump(s) may be selected for activation during period(s) of relatively high demand for hydraulic fluid (e.g., a multiple-pump operating mode). FIG. 1 further illustrates that designation(s) of the multiple pumps as primary/secondary/tertiary pump(s) may be dynamically changed in response to a failure indication from a particular pump. Although FIG. 1 illustrates an example of an aircraft that include multiple pumps 104, the pumps 104 may be associated with other systems, such as land, space, or water vehicle(s) or a fixed or mobile system, such as an oil platform. In these alternative examples, the avionics system 142 may correspond to another electronics system that is configured to provide non-aircraft system information.

FIG. 2 is a notional altitude diagram 200 depicting a particular example of dynamic activation of (demand) pumps of a fluid power system of an aircraft. FIG. 2 illustrates that one pump (of a fluid power system that includes at least three pumps) may be selected for use as a primary (demand) pump based on a particular pump cycle location data value (e.g., values corresponding to odd/even numbered days). FIG. 2 further illustrates that another pump may be used as a secondary (demand) pump (e.g., during periods associated with relatively high demand from one or more aircraft hydraulic systems). In a particular embodiment, the example of dynamic activation of (demand) pumps illustrated in FIG. 2 may correspond to an example of dynamic activation of the pumps 104 of FIG. 1.

In the particular example of FIG. 2, various stages of a flight are shown in simplified form for illustrative purposes only. It will be appreciated that different number(s) of pumps of the fluid hydraulic system may be activated at different stage(s) of a flight. FIG. 2 illustrates an example in which a first pump cycle location value 202 (illustrated as "Pump Cycle Value(1)" in FIG. 2) is associated with one flight, and a second pump cycle location value 204 (illustrated as "Pump Cycle Value(2)" in FIG. 2) is associated with another flight. In alternative cases, particular pump(s) may be designated for use in a single-pump operating mode and/or a multiple-pump operating mode for more than one flight (e.g., multiple takeoff and landing cycles in a single day), among other alternatives.

In the embodiment illustrated in FIG. 2, the first pump cycle location value 202 corresponds to a first day (e.g., an odd-numbered day), and the second pump cycle location data 204 corresponds to a second day that immediately follows the first day (e.g., an even-numbered day). In the example of FIG. 2, a (demand) pump designation for a single-pump operating mode and a (demand) pump designation for a multiple-pump operating mode (e.g., a dual-pump mode) changes from the first day to the second day. For example, on the first day, a first pump (illustrated as "1ST ADP" in FIG. 2) is designated for use during a single-pump operating mode, and a third pump (illustrated as "3RD ADP" in FIG. 2) is designated for use as an additional pump in a multiple-pump operating mode. On the second day, a second pump (illustrated as "2ND ADP" in FIG. 2) is designated for use in the single-pump operating mode, and the third pump is designated for use as the additional pump in the multiple-pump operating mode. For example, referring to FIG. 1, the first pump 106 may be designated for use in the single-pump operating mode on the first day, and the second pump 108 may be designated for use in the single-pump operating mode on the second day. The third pump 110 may be designated for use as the additional pump for use in the multiple-pump operating mode on the first day and the second day.

FIG. 2 illustrates that a first multiple-pump operating mode 206 on the first day may correspond to a takeoff portion of a flight (e.g., a first time period associated with relatively high demand for additional hydraulic fluid). In this case, both the first pump and the third pump may be activated. For example, referring to FIG. 1, the avionics system 142 may provide a control input to the control system 114 that corresponds to a multiple-pump operating mode control input. In response, the first HYDIM 118 may activate the first pump 106 (to provide additional hydraulic fluid to the one or more aircraft hydraulic systems 112), and the third HYDIM 122 may activate the third pump 110 (to provide additional hydraulic fluid to the one or more aircraft hydraulic systems 112).

FIG. 2 further illustrates that a single-pump operating mode 208 on the first day may correspond to a different portion of the flight (e.g., a time period associated with relatively low demand for additional hydraulic fluid compared to the takeoff portion). In this case, the first pump may be activated, while the third pump may remain inactive. For example, referring to FIG. 1, the avionics system 142 may provide a control input to the control system 114 that corresponds to a single-pump operating mode control input. In response, the first HYDIM 118 may activate the first pump 106 (to provide additional hydraulic fluid to the one or more aircraft hydraulic systems 112). The third pump 110 may remain inactive responsive to the single-pump operating mode control input.

FIG. 2 illustrates a second multiple-pump operating mode 210 on the first day may correspond to a high-lift extension portion of the flight (e.g., a second time period during the flight that is associated with relatively high demand for additional hydraulic fluid). In this case, both the first pump and the third pump may be activated. For example, referring to FIG. 1, the avionics system 142 may provide a control input to the control system 114 that corresponds to a multiple-pump operating mode control input. In response, the first HYDIM 118 may activate the first pump 106 (to provide additional hydraulic fluid to the one or more aircraft hydraulic systems 112), and the third HYDIM 122 may activate the third pump 110 (to provide additional hydraulic fluid to the one or more aircraft hydraulic systems 112).

FIG. 2 illustrates a second flight associated with the second pump cycle location value 204 (e.g., a flight on a second day that immediately follows the first day associated with the second pump cycle location value 202). In FIG. 2, the designation of the primary pump for use in the single-pump operating mode changes from the first pump on the first day to the second pump on the second day. In the example of FIG. 2, the designation of the secondary pump (e.g., the third pump) does not change from the first day to the second day. In other cases, the third pump may be designated as the primary pump on the first day, and the second pump may be designated as the secondary pump on the second day, among other alternatives. Thus, FIG. 2 is an illustrative, non-limiting example of a change of pump designation(s) in response to transition from one time period (e.g., a first day) to another time period (e.g., a second day).

FIG. 2 illustrates that a first multiple-pump operating mode 212 on the second day may correspond to a takeoff portion of the second flight. In this case, both the second pump and the third pump may be activated. For example, referring to FIG. 1, the avionics system 142 may provide a control input to the control system 114 that corresponds to a multiple-pump operating mode control input. In response, the second HYDIM 120 may activate the second pump 108, and the third HYDIM 122 may activate the third pump 110.

FIG. 2 further illustrates that a single-pump operating mode 214 on the second day may correspond to a different portion of the second flight. In this case, the second pump may be activated, while the third pump may remain inactive. For example, referring to FIG. 1, the avionics system 142 may provide a control input to the control system 114 that corresponds to a single-pump operating mode control input. In response, the second HYDIM 120 may activate the second pump 108. The third pump 110 (and the first pump 106) may remain inactive responsive to the single-pump operating mode control input.

FIG. 2 illustrates a second multiple-pump operating mode 216 on the second day may correspond to a high-lift extension portion of the second flight. In this case, both the second pump and the third pump may be activated. For example, referring to FIG. 1, the avionics system 142 may provide a control input to the control system 114 that corresponds to a multiple-pump operating mode control input. In response, the second HYDIM 120 may activate the second pump 108, and the third HYDIM 122 may activate the third pump 110.

Thus, FIG. 2 illustrates one example of an adaptive pump activation in which one pump of a fluid power system (that includes at least three pumps) may be selected for use as a primary (demand) pump in a single-pump operating mode during one time period (e.g., a first day, a first takeoff/landing cycle, etc.). FIG. 2 further illustrates that a different pump may be selected for use as the primary pump in the single-pump operating mode during another time period (e.g., a second day, a second takeoff/landing cycle, etc.). FIG. 2 further illustrates that another pump may be used as a secondary (demand) pump in a multiple-pump operating mode (e.g., during periods associated with relatively high demand from one or more aircraft hydraulic systems).

Figure 3:
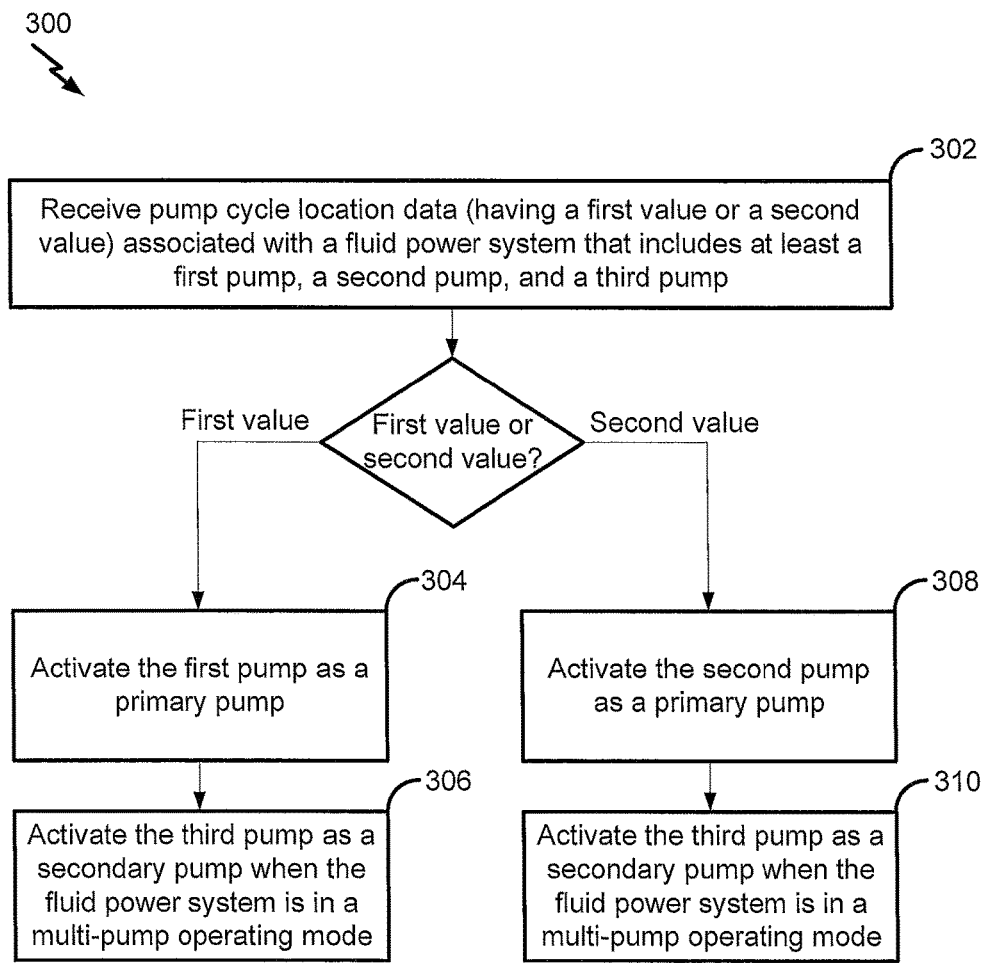
FIG. 3 is a flowchart depicting a particular embodiment of a method of dynamically controlling activation of pumps of a fluid power system.

FIG. 3 is a flowchart depicting an exemplary embodiment of a method 300 of dynamic activation of (demand) pumps of a fluid power system. In the particular embodiment illustrated in FIG. 3, one pump is selected for activation as a primary pump based on whether pump cycle location data has a first value or a second value. In a particular embodiment, the first value may correspond to a first day (e.g., an odd-numbered day), and the second value may correspond to a second day that immediately follows the first day (e.g., an even-numbered day). FIG. 3 further illustrates that another pump is activated as a secondary pump when the fluid power system is in a multiple-pump (e.g., dual-pump) operating mode.

The method 300 includes receiving pump cycle location data associated with a fluid power system, at 302. The fluid power system includes at least a first pump, a second pump, and a third pump. The pump cycle location data may include a first value or a second value. For example, referring to FIG. 1, the fluid power system 102 includes the first pump 106, the second pump 108, and the third pump 110. The control system 114 may receive the pump cycle location data 144 (e.g., from the avionics system 142) associated with the fluid power system 102.

FIG. 3 illustrates that the method 300 may include activating the first pump as a primary pump based on the pump cycle location data having the first value, as shown at 304. When the pump cycle location data has the first value, the method 300 may also include activating the third pump as a secondary pump when the fluid power system is in a multiple-pump operating mode, at 306.

For example, referring to FIG. 1, when the pump cycle location data 144 has a first value (e.g., corresponding to an odd-numbered day), the first HYDIM 118 may activate the first pump 106 as the primary pump. In this case, the third HYDIM 122 may activate the third pump 110 as the secondary pump when the fluid power system 102 is operating in the multiple-pump operating mode. As described further with respect to FIG. 2, the first pump 106 may be activated during a single-pump operating mode of an aircraft, and both the first pump 106 and the third pump 110 may be activated during a dual-pump operating mode.

FIG. 3 further illustrates that the method 300 may include activating the second pump as the primary pump based on the pump cycle location data having the second value, as shown at 308. When the pump cycle location data has the second value, the method 300 may also include activating the third pump as the secondary pump when the fluid power system is in the multiple-pump operating mode, at 310.

For example, referring to FIG. 1, when the pump cycle location data 144 has a second value (e.g., corresponding to an even-numbered day), the second HYDIM 120 may activate the second pump 108 as the primary pump. In this case, the third HYDIM 122 may activate the third pump 110 as the secondary pump when the fluid power system 102 is operating in the multiple-pump operating mode. As described further with respect to FIG. 2, the second pump 108 may be activated during a single-pump operating mode of an aircraft, and both the second pump 108 and the third pump 110 may be activated during a dual-pump operating mode.

Thus, FIG. 3 illustrates one example of a method of adaptive activation of different pumps of a fluid power system (that includes at least three pumps) based on pump cycle location data. Activating different pump(s) of the fluid power system based on a pump cycle may substantially "load-level" the pumps (to reduce wear on one particular pump). Further, rather than allowing pump(s) to remain idle, periodically activating each of the pumps in either the single-pump operating mode or in the multiple-pump operating mode may reduce a likelihood that more than two pumps is unavailable as an alternate primary/secondary pump in the event of a pump failure.

Figure 4:
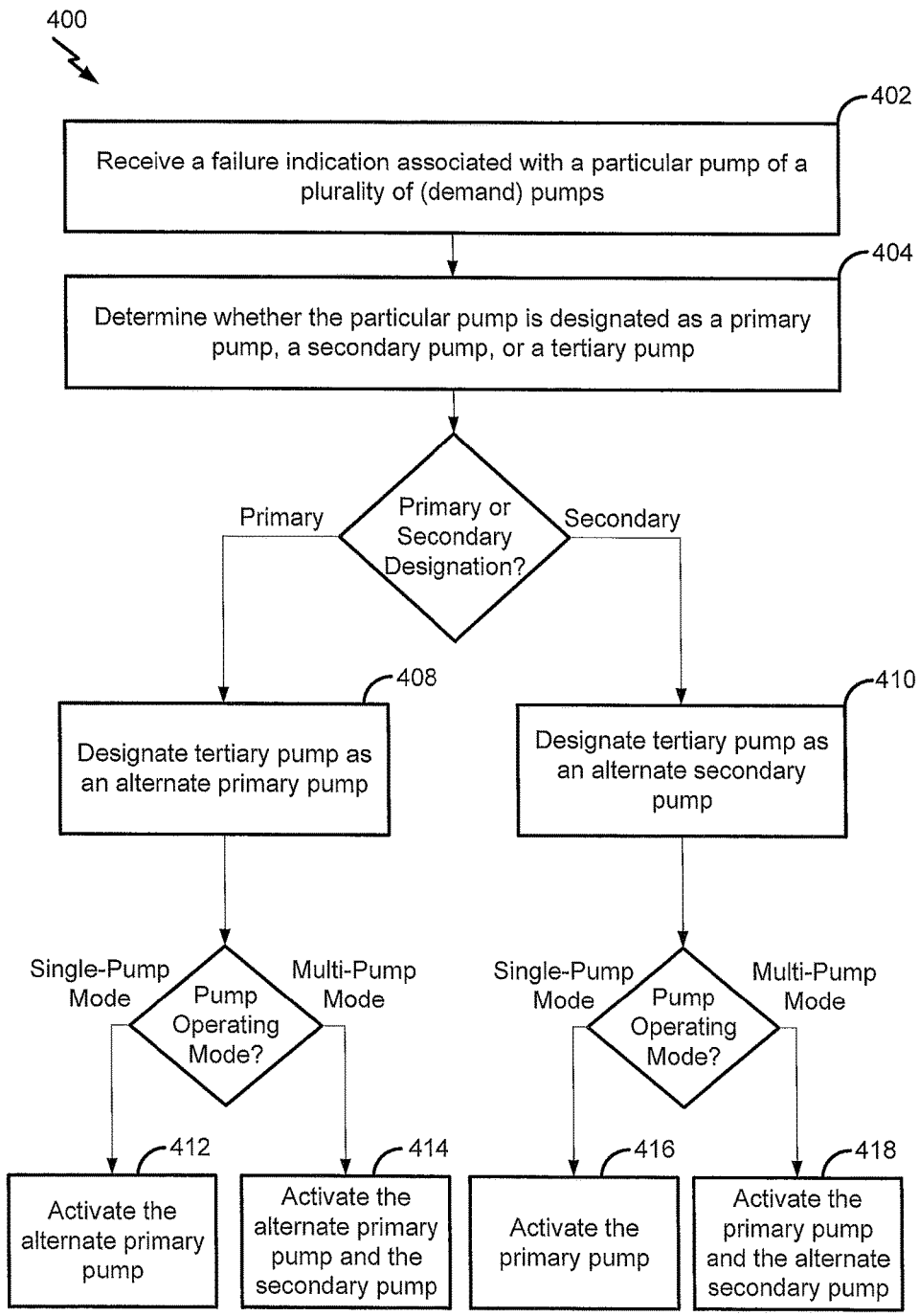
FIG. 4 is a flowchart depicting a particular embodiment of a method of dynamically controlling activation of pumps of a fluid power system responsive to receiving a failure indication from a particular pump.

FIG. 4 is a flowchart depicting an exemplary embodiment of a method 400 of dynamic activation of pumps of a fluid power system responsive to receiving a failure indication from a particular pump. In the example of FIG. 4, an alternate primary pump or an alternate secondary pump may activated depending on whether the failure indication is received from a pump that is (currently) designated as the primary pump or the secondary pump.

In the example of FIG. 4, the method 400 includes receiving a failure indication associated with a particular pump of a plurality of (demand) pumps, at 402. For example, referring to FIG. 1, the control system 114 associated with the fluid power system 102 may receive a failure indication from the first pump 106, from the second pump 108, or from the third pump 110.

In response to receiving the failure indication, the method 400 may include determining whether the particular pump is designated as a primary pump, a secondary pump, or a tertiary pump, at 404. For example, referring to FIG. 1, when the pump cycle location data 144 has a first value (e.g., a first day), the first pump 106 may be designated as a primary pump, the third pump 110 may be designated as a secondary pump, and the second pump 108 may be designated as a tertiary pump. When the pump cycle location data 144 has a second value (e.g., a second day immediately following the first day), the second pump 108 may be designated as the primary pump, the third pump 110 may be designated as the secondary pump, and the first pump 106 may be designated as the tertiary pump.

FIG. 4 illustrates that, when the particular pump is designated as the primary pump, the method 400 may include designating the tertiary pump as an alternate primary pump, at 408. For example, referring to FIG. 1, when the first pump 106 is designated as the primary pump (e.g., when the pump cycle location data 144 has the first value), the designation logic 124 may designate the second pump 108 as an alternate primary pump responsive to failure of the first pump 106. As another example, referring to FIG. 1, when the second pump 108 is designated as the primary pump (e.g., when the pump cycle location data 144 has the second value), the designation logic 124 may designate the first pump 106 as the alternate primary pump responsive to failure of the second pump 108.

When the particular pump is designated as the secondary pump, the method 400 may include designating the tertiary pump as an alternate secondary pump, at 410. For example, referring to FIG. 1, the third pump 110 may be designated as the secondary pump (e.g., when the pump cycle location data 144 has either the first value or the second value). When the first pump 106 is designated as a primary pump (e.g., when the pump cycle location data 144 has the first value), the designation logic 124 may designate the second pump 108 as an alternate secondary pump responsive to failure of the third pump 110. When the second pump 108 is designated as the primary pump (e.g., when the pump cycle location data 144 has the second value), the designation logic 124 may designate the first pump 106 as the alternate secondary pump responsive to failure of the third pump 110.

FIG. 4 further illustrates that, when the failure indication is associated with a (currently designated) primary pump, the alternate primary pump may be activated when the fluid power system is in a single-pump operating mode (as shown at 412). In this case, the alternate primary pump and the secondary pump may be activated when the fluid power system is in a multiple-pump operating mode (as shown at 414).

For example, referring to FIG. 1, when the pump cycle location data 144 has the first value, the first pump 106 may be designated as the primary pump. In this case, when the failure indication is associated with the first pump 106, the second pump 108 may be designated as the alternate primary pump. When the fluid power system 102 is in a single-pump operating mode, the second HYDIM 120 may activate the second pump 108. When the fluid power system 102 is in a multiple-pump operating mode, the second HYDIM 120 may activate the second pump 108 and the third HYDIM 122 may activate the third pump 110.

As another example, referring to FIG. 1, when the pump cycle location data 144 has the second value, the second pump 108 may be designated as the primary pump. In this case, when the failure indication is associated with the second pump 108, the first pump 106 may be designated as the alternate primary pump. When the fluid power system 102 is in a single-pump operating mode, the first HYDIM 118 may activate the first pump 106. When the fluid power system 102 is in a multiple-pump operating mode, the first HYDIM 118 may activate the first pump 106 and the third HYDIM 122 may activate the third pump 110.

FIG. 4 further illustrates that, when the failure indication is associated with a (currently designated) secondary pump, the primary pump may be activated while the alternate secondary pump remains inactive when the fluid power system is in a single-pump operating mode (as shown at 416). When the fluid power system is in a multiple-pump operating mode, both the primary pump and the alternate secondary pump may be activated (as shown at 418).

For example, referring to FIG. 1, the third pump 110 may be designated as the secondary pump (e.g., when the pump cycle location data 144 has either the first value or the second value). In this case, when the failure indication is associated with the third pump 110, either the first pump 106 or the second pump 108 may be designated as the alternate secondary pump (depending on whether the pump cycle location data 144 has the first value or the second value).

As an example, when the second pump 108 is designated as the alternate secondary pump (e.g., when the pump cycle location data 144 has the first value), the first HYDIM 118 may activate the first pump 106 when the fluid power system 102 is in a single-pump operating mode. When the fluid power system 102 is in a multiple-pump operating mode, the first HYDIM 118 may activate the first pump 106 and the second HYDIM 120 may activate the second pump 108.

As another example, when the first pump 106 is designated as the alternate secondary pump (e.g., when the pump cycle location data 144 has the second value), the second HYDIM 120 may activate the second pump 108 when the fluid power system 102 is in a single-pump operating mode. When the fluid power system 102 is in a multiple-pump operating mode, the second HYDIM 120 may activate the second pump 108 and the first HYDIM 118 may activate the first pump 106.

Thus, FIG. 4 illustrates an example of a method of dynamic designation/activation of different pump(s) of a fluid power system (that includes at least three pumps) in response to a pump failure. Including additional (demand) pump(s) in the fluid power system that operates in either a single-pump operating mode or in a multiple-pump operating mode may reduce a likelihood that a designated number of pumps is unavailable for use in the multiple-pump operating mode in the event of a pump failure.

Figure 5:
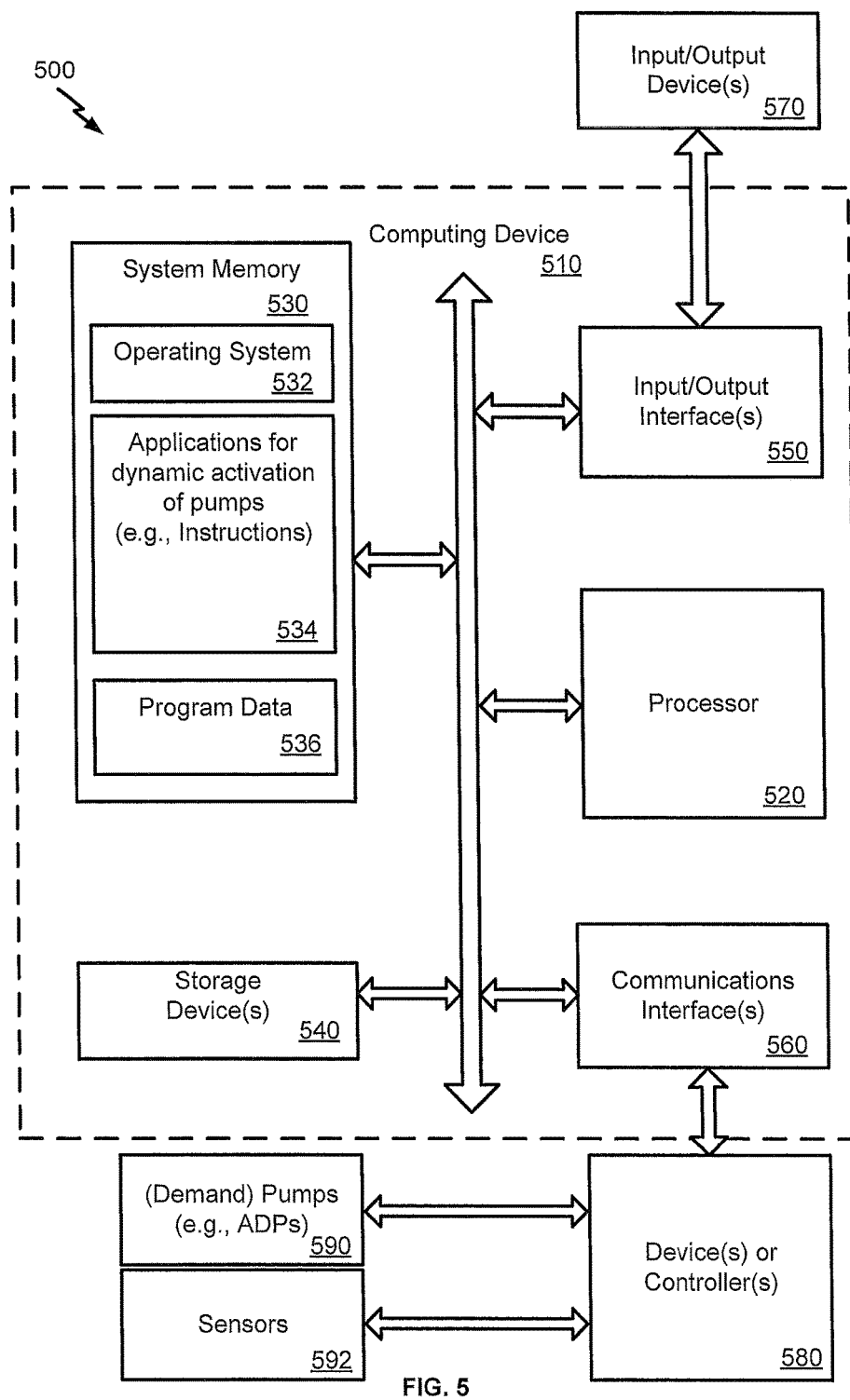
FIG. 5 is an illustration of a block diagram of a computing environment including a general purpose computing device configured to support embodiments of computer-implemented methods and computer-executable program instructions (or code) according to the present disclosure.

FIG. 5 is an illustration of a block diagram of a computing environment 500 including a general purpose computing device 510 configured to support embodiments of computer-implemented methods and computer-executable program instructions (or code) according to the present disclosure. For example, the computing device 510, or portions thereof, may execute instructions to dynamically designate/activate pumps 590 (e.g., pneumatically-driven hydraulic demand pumps of a vehicle, such as an aircraft). For example, the pumps 590 of FIG. 5 may correspond to the pumps 104 of FIG. 1. The computing device 510, or portions thereof, may further execute instructions according to any of the methods described herein.

The computing device 510 may include a processor 520. The processor 520 may communicate with the system memory 530, one or more storage devices 540, one or more input/output interfaces 550, one or more communications interfaces 560, or a combination thereof. The system memory 530 may include volatile memory devices (e.g., random access memory (RAM) devices), nonvolatile memory devices (e.g., read-only memory (ROM) devices, programmable read-only memory, and flash memory), or both. The system memory 530 may include an operating system 532, which may include a basic/input output system for booting the computing device 510 as well as a full operating system to enable the computing device 510 to interact with users, other programs, and other devices. The system memory 530 may include one or more applications 534 which may be executable by the processor 520. For example, the one or more applications 534 may include instructions executable by the processor 520 to dynamically designate/activate one or more (demand) pumps of a fluid power system that includes at least three (demand) pumps. The system memory 530 may include program data 536 usable for controlling the activation/designation of particular (demand) pump(s) of the fluid power system.

The processor 520 may also communicate with one or more storage devices 540. For example, the one or more storage devices 540 may include nonvolatile storage devices, such as magnetic disks, optical disks, or flash memory devices. The storage devices 540 may include both removable and non-removable memory devices. The storage devices 540 may be configured to store an operating system, images of operating systems, applications, and program data. In a particular embodiment, the memory 530, the storage devices 540, or both, include tangible computer-readable media.

The processor 520 may also communicate with one or more input/output interfaces 550 that enable the computing device 510 to communicate with one or more input/output devices 570 to facilitate user interaction. The processor 520 may detect interaction events based on user input received via the input/output interfaces 550. Additionally, the processor 520 may send a display to a display device via the input/output interfaces 550.

The processor 520 may communicate with devices or controllers 580 via the one or more communications interfaces 560. For example, the devices or controllers 580 may correspond to the HYDIMs 116 of FIG. 1. FIG. 5 further illustrates that the devices or controllers 580 may be communicatively coupled to a plurality of (demand) pumps 590 and may be communicatively coupled one or more sensors 592 (e.g., temperature sensors, pressure sensors, etc.). For example, the pumps 590 may correspond to the pumps 104 of FIG. 1, and the one or more sensors 592 may correspond to the sensor(s) 126-130 of FIG. 1.

Figure 6:
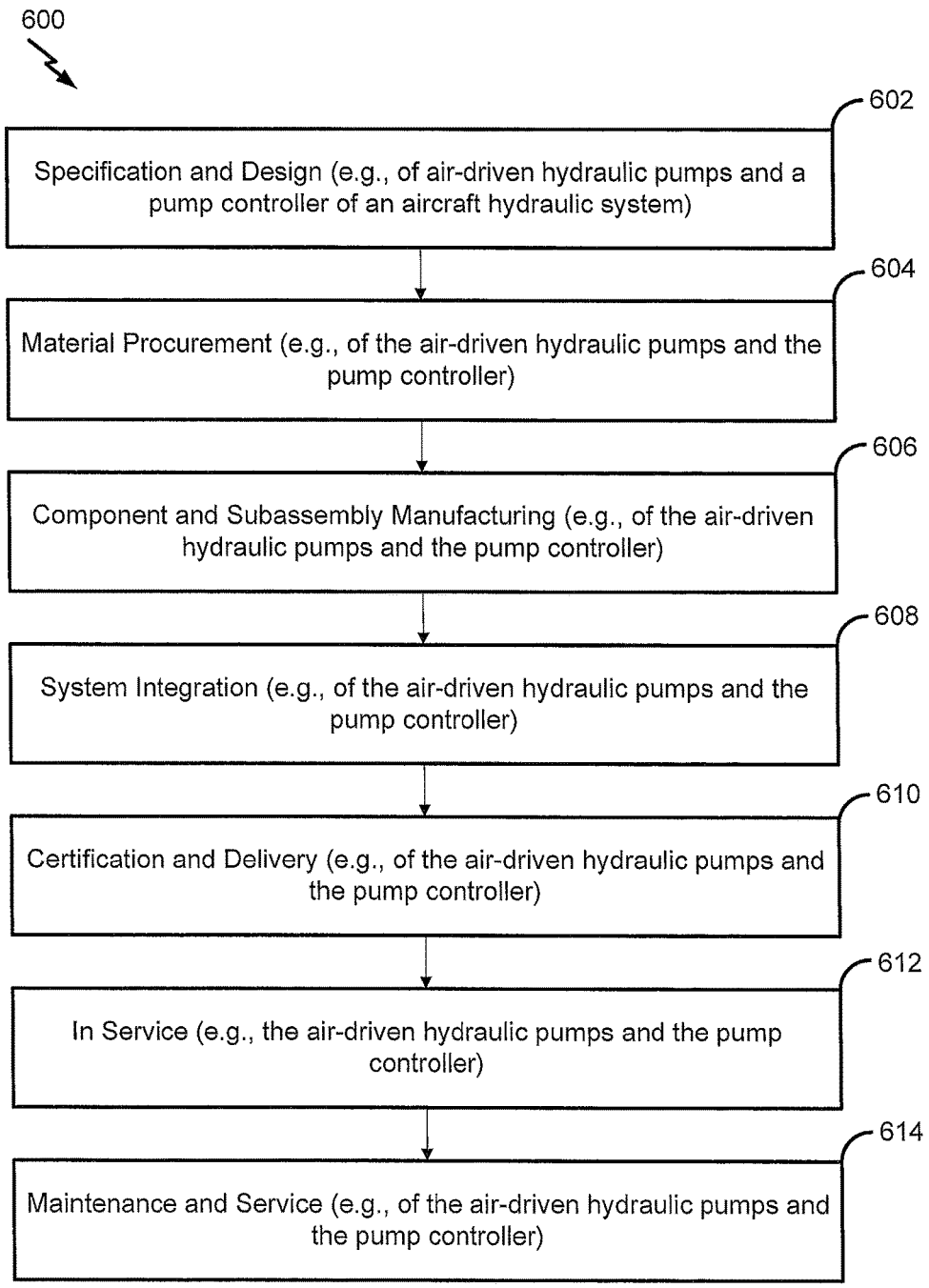
FIG. 6 is a flow diagram of aircraft production and service methodology.
Figure 7:
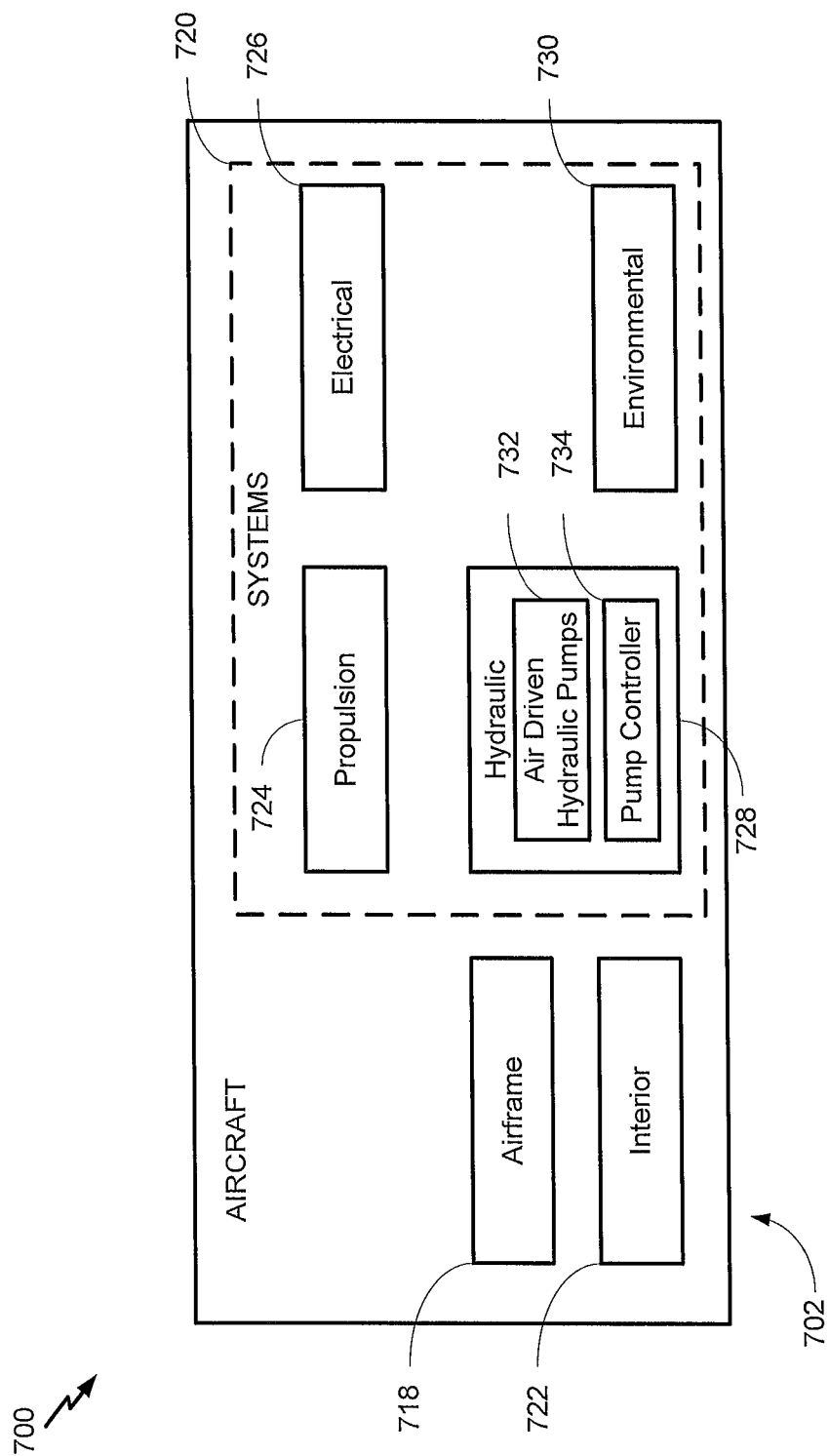
FIG. 7 is a block diagram of an aircraft.

Embodiments of the disclosure may be described in the context of an aircraft manufacturing and service method 600 as shown in FIG. 6 and an aircraft 702 as shown in FIG. 7. The aircraft 702 includes a fluid control system that includes at least three pumps (e.g., air-driven hydraulic pumps) and may include a pump controller to dynamically control activation of particular pump(s) of the fluid control system. During pre-production, exemplary method 600 may include specification and design 602 of the aircraft 702 and material procurement 604. During production, component and subassembly manufacturing 606 and system integration 608 of the aircraft 702 takes place. Thereafter, the aircraft 702 may go through certification and delivery 610 in order to be placed in service 612. While in service by a customer, the aircraft 702 is scheduled for routine maintenance and service 614 (which may also include modification, reconfiguration, refurbishment, and so on).

Each of the processes of method 600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 7, the aircraft 702 produced by exemplary method 600 may include an airframe 718 with a plurality of systems 720 and an interior 722. Examples of high-level systems 720 include one or more of a propulsion system 724, an electrical system 726, a hydraulic system 728, and an environmental system 730. The hydraulic system 728 may include a plurality of (demand) pumps 732 (e.g., air-driven pumps) and a pump controller 734. To illustrate, the pumps 732 of the aircraft 702 of FIG. 7 may correspond to the pumps 104 of FIG. 1, and the pump controller 734 of the aircraft 702 of FIG. 7 may correspond to the HYDIMs 116 of FIG. 1. Any number of other systems may be included. Although an aerospace example is shown, the principles of the invention may be applied to other industries, such as the automotive industry.

Apparatus and methods embodied herein may be employed during any one or more of the stages of the production and service method 600. For example, components or subassemblies corresponding to production process 606 may be fabricated or manufactured in a manner similar to components or subassemblies produced while the aircraft 702 is in service. Also, one or more apparatus embodiments, method embodiments, or a combination thereof may be utilized during the production stages 606 and 608, for example, by substantially expediting assembly of or reducing the cost of an aircraft 702. Similarly, one or more of apparatus embodiments, method embodiments, or a combination thereof may be utilized while the aircraft 702 is in service, for example and without limitation, to maintenance and service 614.

Embodiments described above are illustrative and do not limit the disclosure. It is to be understood that numerous modifications and variations are possible in accordance with the principles of the present disclosure.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A method comprising:
    receiving pump designation data associated with a fluid power system that includes a plurality of pumps, the plurality of pumps including at least a first pump, a second pump, and a third pump;
    based on the pump designation data having a first value, activating the first pump as a primary pump;
    based on the pump designation data having a second value, activating the second pump as the primary pump;
    activating the third pimp as a secondary pump for each value of the pump designation data, the secondary pump operational when the fluid power system is in a multiple-pump operating mode;
    receiving a failure indication, wherein the failure indication is associated with a particular pump being in an inoperative state, and wherein the particular pump is determined to be in the inoperative state based on one or more monitored parameters that are indicative of the particular pump being unable to operate when commanded, a failure of the particular pump to operate when commanded, or a combination thereof;

when the failure indication is received from the first pump, activating the second pump as an alternate primary pump when the pump designation data has the first value;
when the failure indication is received from the second pump, activating the first pump as the alternate primary pump when the pump designation data has the second value;
when the failure indication is received from the third pump:
   activating the second pump as an alternate secondary pump when the pump designation data has the first value; and
   activating the first pump as the alternate secondary pump when the pump designation data has the second value; and
when the failure indication is received from more than one pump, communicating a fault message to indicate that inadequate fluid power is available.

2. The method of claim 1, further comprising:
based on the pump designation data having the first value, designating the second pump as a tertiary pump; and
based on the pump designation data having the second value, designating the first pump as the tertiary pump.

3. The method of claim 2, wherein the tertiary pump remains inactive when the fluid power system is in the multiple-pump operating mode.

4. The method of claim 1, wherein the plurality of pumps includes a plurality of pneumatically-driven hydraulic pumps, wherein each pump of the plurality of pumps is configured to operate at a first speed responsive to a first control input associated with the first speed, and wherein each pump of the plurality of pumps is configured to operate at a second speed responsive to a second control input associated with the second speed.

5. The method of claim 1, wherein the first value corresponds to a first day and subsequent odd numbered days, and wherein the second value corresponds to a second day and subsequent even numbered days, the even numbered days immediately following the odd numbered days.

6. The method of claim 1, wherein the second pump is activated as the alternate primary pump when the fluid power system is in a single-pump operating mode.

7. The method of claim 1, wherein the second pump is activated as the alternate primary pump when the fluid power system is in the multiple-pump operating mode.

8. The method of claim 1, wherein the first pump is activated as the alternate primary pump when the fluid power system is in a single-pump operating mode.

9. The method of claim 1, wherein the first pump is activated as the alternate primary pump when the fluid power system is in the multiple-pump operating mode.

10. A vehicle comprising:
a fluid power system comprising a plurality of pumps, wherein the plurality of pumps includes at least a first pump, a second pump, and a third pump;
a control system communicatively coupled to the fluid power system, wherein the control system includes logic to:
   receive pump designation data associated with the fluid power system;
   based on the pump designation data having a first value, activate the first pump as a primary pump;
   based on the pump designation data having a second value, activate the second pump as the primary pump;
   activate the third pump as a secondary pump for each value of the pump designation data, the secondary pump operational when the fluid power system is in a multiple-pump operating mode;
   receive a failure indication, wherein the failure indication is associated with a particular pump being in an inoperative state, and wherein the particular pump is determined to be in the inoperative state based on one or more monitored parameters that are indicative of the particular pump being unable to operate when commanded, a failure of the particular pump to operate when commanded, or a combination thereof;
   when the failure indication is received from the first pump, activate the second pump as an alternate primary pump when the pump designation data has the first value;
   when the failure indication is received from the second pump, activate the first pump as the alternate primary pump when the pump designation data has the second value;
   when the failure indication is received from the third pump:
      activate the second pump as an alternate secondary pump when the pump designation data has the first value; and
      activate the first pump as the alternate secondary pump when the pump designation data has the second value; and
   when the failure indication is received from more than one pump, communicate a fault message to indicate that inadequate fluid power is available.

11. The vehicle of claim 10, wherein the control system further includes logic to:
designate the second pump as a tertiary pump when the pump designation data has the first value; and
designate the first pump as the tertiary pump when the pump designation data has the second value,
wherein the tertiary pump remains inactive when the fluid power system is in the multiple-pump operating mode.

12. The vehicle of claim 10, wherein the vehicle includes an aircraft, wherein the plurality of pumps includes a plurality of air-driven hydraulic pumps, wherein a first bleed air source of the aircraft provides air to a single pump of the plurality of air-driven hydraulic pumps when the fluid power system is in a single-pump operating mode, and wherein a second bleed air source of the aircraft provides air to multiple pumps of the plurality of air-driven hydraulic pumps when the fluid power system is in the multiple-pump operating mode.

13. The vehicle of claim 10, wherein the vehicle includes an aircraft, wherein the plurality of pumps are configured to provide hydraulic fluid to aircraft hydraulic systems.

14. The vehicle of claim 10, further comprising:
a first sensor associated with the first pump, the first sensor configured to generate first sensor data, the first sensor data including first temperature data associated with the first pump, first pressure data associated with the first pump, or combination thereof;
a second sensor associated with the second pump, the second sensor configured to generate second sensor data, the second sensor data including second temperature data associated with the second pump, second pressure data associated with the second pump, or combination thereof; and
a third sensor associated with the third pump, the third sensor configured to generate third sensor data, the third sensor data including third temperature data associated with the third pump, third pressure data associated with the third pump, or combination thereof, wherein the control system further includes logic to receive:
  the first sensor data from the first sensor, the first sensor data includes a first temperature value associated with the first pump and a first pressure value associated with the first pump;
  the second sensor data from the second sensor, the second sensor data includes a second temperature value associated with the second pump and a second pressure value associated with the second pump; and
  the third sensor data from the third sensor, the third sensor data includes a third temperature value associated with the third pump and a third pressure value associated with third pump.

15. A method comprising:
receiving information associated with an aircraft at a control system, wherein the control system is communicatively coupled to a fluid power system of the aircraft, and wherein the fluid power system includes at least three pumps;
determining, based on the information associated with the aircraft, pump designation data associated with the fluid power system;
based on a first value of the pump designation data, designating a first pump of the at least three pumps as a primary pump during operation of the aircraft;
based on a second value of the pump designation data, designating a second pump of the at least three pumps as the primary pump during operation of the aircraft;
designating a third pump of the at least three pumps as a secondary pump during operation of the aircraft regardless of the pump designation data;
receiving a failure indication, wherein the failure indication is associated with a particular pump being in an inoperative state, and wherein the particular pump is determined to be in the inoperative state based on one or more monitored parameters that are indicative of the particular pump being unable to operate when commanded, a failure of the particular pump to operate when commanded, or a combination thereof;
when the failure indication is received from the first pump, activating the second pump as an alternate primary pump when the pump designation data has the first value;
when the failure indication is received from the second pump, activating the first pump as the alternate primary pump when the pump designation data has the second value;
when the failure indication is received from the third pump:
  activating the second pump as an alternate secondary pump when the pump designation data has the first value; and
  activating the first pump as the alternate secondary pump when the pump designation data has the second value; and
when the failure indication is received from more than one pump, communicating a fault message to indicate that inadequate fluid power is available.

16. The method of claim 15, further comprising:
receiving a control input at the control system;
when the fluid power system is in a single-pump operating mode, activating the primary pump without activating the secondary pump responsive to the control input; and
when the fluid power system is in a multiple-pump operating mode, activating the primary pump and the secondary pump responsive to the control input.

17. The method of claim 16, wherein at least one of the at least three pumps is designated as a tertiary pump that remains inactive when the fluid power system is in the multiple-pump operating mode.

18. A control system for a fluid power system, the control system comprising:
a first pump controller, a second pump controller, and a third pump controller associated with at least a first pump, a second pump, and a third pump, wherein each pump controller includes logic to:
  receive pump designation data associated with the fluid power system;
  based on the pump designation data having a first value, cause the first pump controller to activate the first pump as a primary pump;
  based on the pump designation data having a second value, cause the second pump controller to activate the second pump as the primary pump;
  cause the third pump controller to activate the third pump as a secondary pump for each value of the pump designation data, the secondary pump operational when the fluid power system is in a multiple-pump operating mode;
  receive a failure indication, wherein the failure indication is associated with a particular pump being in an inoperative state, and wherein the particular pump is determined to be in the inoperative state based on one or more monitored parameters that are indicative of the particular pump being unable to operate when commanded, a failure of the particular pump to operate when commanded, or a combination thereof;
  when the failure indication is received from the first pump, activate the second pump as an alternate primary pump when the pump designation data has the first value;
  when the failure indication is received from the second pump, activate the first pump as the alternate primary pump when the pump designation data has the second value;
  when the failure indication is received from the third pump:
    activate the second pump as an alternate secondary pump when the pump designation data has the first value; and
    activate the first pump as the alternate secondary pump when the pump designation data has the second value; and
  when the failure indication is received from more than one pump, communicate a fault message to indicate that inadequate fluid power is available.

19. The control system of claim 18, wherein:
the first pump controller is configured to:
receive the failure indication associated with the secondary pump when the pump designation data has the second value; and
responsive to the failure indication, activate the first pump as the alternate secondary pump; and
the second pump controller is configured to:
receive the failure indication associated with the secondary pump when the pump designation data has the first value; and
responsive to the failure indication, activate the second pump as the alternate secondary pump.

20. The control system of claim 18, further comprising:
a first sensor associated with the first pump, the first sensor configured to generate first sensor data, the first sensor data including a first temperature value associated with the first pump;
a second sensor associated with the second pump, the second sensor configured to generate second sensor data, the second sensor data including a second temperature value associated with the second pump; and
a third sensor associated with the third pump, the third sensor configured to generate third sensor data, the third sensor data including a third temperature value associated with the third pump,
wherein each pump controller further includes logic to generate the failure indication based on at least one of:
a comparison of the first temperature value and a first temperature threshold, the first temperature value received from the first sensor and the first temperature threshold indicative a first pump failure;
a comparison of the second temperature value and a second temperature threshold, the second temperature value received from the second sensor and the second temperature threshold indicative a second pump failure; or
a comparison of the third temperature value and a third temperature threshold, the third temperature value received from the third sensor and the third temperature threshold indicative a third pump failure.

21. The control system of claim 18, further comprising:
a first sensor associated with the first pump, the first sensor configured to generate first sensor data, the first sensor data including a first pressure value associated with the first pump;
a second sensor associated with the second pump, the second sensor configured to generate second sensor data, the second sensor data including a second pressure value associated with the second pump; and
a third sensor associated with the third pump, the third sensor configured to generate third sensor data, the third sensor data including a third pressure value associated with the third pump,
wherein each pump controller further includes logic to generate the failure indication based on at least one of:
a comparison of the first pressure value and a first pressure threshold, the first pressure value received from the first sensor and the first pressure threshold indicative a first pump failure;
a comparison of the second pressure value and a second pressure threshold, the second pressure value received from the second sensor and the second pressure threshold indicative a second pump failure; or
a comparison of the third pressure value and a third pressure threshold, the third pressure value received from the third sensor and the third pressure threshold indicative a third pump failure.

* * * * *

UNITED STATES PATENT AND TRADEMARK OFFICE
CERTIFICATE OF CORRECTION

PATENT NO.        : 10,040,541 B2
APPLICATION NO.   : 14/626676
DATED             : August 7, 2018
INVENTOR(S)       : Thomas M. Wilson et al.

Page 1 of 1

It is certified that error appears in the above-identified patent and that said Letters Patent is hereby corrected as shown below:

In the Claims

Column 20, Claim 1, Line 56, "activating the third pimp" should read --activating the third pump--.

Signed and Sealed this
Ninth Day of October, 2018

Andrei Iancu
*Director of the United States Patent and Trademark Office*